United States Patent
Huang (10) Patent No.: US 12,347,395 B2
(45) Date of Patent: Jul. 1, 2025

(54) ADAPTIVE DISPLAY BACKLIGHT CONTROL SYSTEM AND METHOD FOR CONTROLLING THE BACKLIGHT

(71) Applicant: Getac Technology Corporation, New Taipei (TW)

(72) Inventor: Cheng-Liang Huang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

(21) Appl. No.: 18/526,145

(22) Filed: Dec. 1, 2023

(65) Prior Publication Data
US 2025/0029568 A1    Jan. 23, 2025

Related U.S. Application Data

(60) Provisional application No. 63/527,509, filed on Jul. 18, 2023.

(51) Int. Cl.
*G09G 3/34* (2006.01)
*F41C 33/02* (2006.01)
(Continued)

(52) U.S. Cl.
CPC ......... *G09G 3/3406* (2013.01); *F41C 33/029* (2013.01); *G06F 1/3231* (2013.01);
(Continued)

(58) Field of Classification Search
CPC ......... G09G 3/3406; G09G 2320/0626; G09G 2320/062; G09G 2330/022; G09G 2360/144; G06F 1/3231; G06F 1/3265
(Continued)

(56) References Cited

U.S. PATENT DOCUMENTS

2004/0208496 A1    10/2004    Pilu
2007/0075965 A1*    4/2007    Huppi ............... H04M 1/72454
                                                                345/156
(Continued)

FOREIGN PATENT DOCUMENTS

CN        102842291 A    12/2012
CN        104133548 A    11/2014
(Continued)

OTHER PUBLICATIONS

Search Report issued on Jul. 16, 2024 for EP application No. 24153118.5, 8 pages.

*Primary Examiner* — Tom V Sheng
(74) *Attorney, Agent, or Firm* — Cooper Legal Group, LLC (57) ABSTRACT

An adaptive display backlight control system and a method for controlling the backlight are provided. The system includes a microcontroller unit, a human presence sensor, a human attention sensor and a backlight regulation module. The microcontroller unit determines a driving signal applied to a backlight module of a display according to a signal relating to if a person is present in front of the display as provided by the human-presence sensor, and a signal relating to if the person pays attention to the display as provided by the human attention sensor. Further, the microcontroller unit can obtain information of ambient light around the display from an ambient light sensor, and then relies on the information of ambient light to regulate the driving signal applied to the backlight module.

17 Claims, 7 Drawing Sheets

(51) Int. Cl.
*G06F 1/3231* (2019.01)
*G06F 1/3234* (2019.01)
*G11B 19/02* (2006.01)
*H04N 1/32* (2006.01)
*H04N 5/77* (2006.01)
*H04N 23/63* (2023.01)
*H04N 23/65* (2023.01)
*H04N 23/66* (2023.01)
*H04N 23/661* (2023.01)
*H04N 23/667* (2023.01)
*H04N 23/90* (2023.01)
*H04N 101/00* (2006.01)

(52) U.S. Cl.
CPC .......... *G06F 1/3265* (2013.01); *G11B 19/022* (2013.01); *G11B 19/027* (2013.01); *H04N 1/32117* (2013.01); *H04N 5/77* (2013.01); *H04N 23/63* (2023.01); *H04N 23/651* (2023.01); *H04N 23/66* (2023.01); *H04N 23/661* (2023.01); *H04N 23/667* (2023.01); *H04N 23/90* (2023.01); *G09G 2320/062* (2013.01); *G09G 2320/0626* (2013.01); *G09G 2330/022* (2013.01); *G09G 2360/144* (2013.01); *H04N 2101/00* (2013.01); *H04N 2201/3202* (2013.01)

(58) Field of Classification Search
USPC .......................................................... 345/84
See application file for complete search history.

(56) References Cited

U.S. PATENT DOCUMENTS

| | | | |
|---|---|---|---|
| 2007/0085157 A1* | 4/2007 | Fadell | H04M 1/72454 257/428 |
| 2008/0006762 A1* | 1/2008 | Fadell | G06F 3/0383 250/201.1 |
| 2009/0262052 A1* | 10/2009 | Yang | H04M 1/22 345/84 |
| 2010/0295839 A1 | 11/2010 | Nagaya et al. | |
| 2012/0169594 A1* | 7/2012 | Zhao | G09G 3/3406 345/158 |
| 2012/0299891 A1 | 11/2012 | Fujiwara et al. | |
| 2013/0135198 A1 | 5/2013 | Hodge et al. | |
| 2018/0182357 A1* | 6/2018 | Yun | G09G 3/3406 |
| 2018/0188803 A1* | 7/2018 | Sharma | G06F 1/3231 |
| 2020/0142471 A1* | 5/2020 | Azam | H04M 1/72454 |
| 2022/0147142 A1* | 5/2022 | Bui | G06F 1/3287 |
| 2022/0357795 A1* | 11/2022 | Sharma | G09G 3/3426 |
| 2023/0195196 A1 | 6/2023 | Raghavulu et al. | |

FOREIGN PATENT DOCUMENTS

| | | |
|---|---|---|
| CN | 105677042 A | 6/2016 |
| CN | 103379300 B | 3/2017 |
| CN | 108646907 A | 10/2018 |
| JP | 2002300447 A | 10/2002 |
| TW | 201636992 A | 10/2016 |
| WO | 2010101697 A2 | 9/2010 |

* cited by examiner

| Scenario | backlight regulation strategy |
|---|---|
| No person in front of display | Turning off backlight or in power-saving mode |
| Person in front of display but not pay attention to the display | Regulating backlight and entering power-saving mode when the time not paying attention to the display reaching a time threshold |
| Person in front of display and also pay attention to the display | Normal backlight |

ADAPTIVE DISPLAY BACKLIGHT CONTROL SYSTEM AND METHOD FOR CONTROLLING THE BACKLIGHT

CROSS-REFERENCE TO RELATED PATENT APPLICATION

This application claims the benefit of priority to the U.S. Provisional Patent Application Ser. No. 63/527,509, filed on Jul. 18, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display capable of regulating backlight according to usage condition, and more particularly to an adaptive display backlight control system and a method for controlling the backlight according to a state of a user using the display.

BACKGROUND OF THE DISCLOSURE

Various power-saving solutions are applicable to the conventional computers, and one of which is to provide a function of periodically turning off a display of a computer by detecting a status of a user using the computer. For example, a status of the user using a computer mouse and a keyboard can be detected. When it is detected that the time that the computer is not used meets a time threshold, the display of the computer is driven to be turned off until the user again uses the computer mouse or the keyboard.

Furthermore, for providing display brightness adapted to an environment, the display of the computer can be equipped with an ambient light sensor. The ambient light sensor allows a computer system to regulate a backlight of the display based on a result by sensing an ambient light.

SUMMARY OF THE DISCLOSURE

Besides the conventional technology that a display backlight can be adjusted according to the status of a computer mouse or a keyboard manipulated by a user and a result of sensing an ambient light, the present disclosure provides a method and a system for adaptively controlling the backlight according to the statuses of whether the user is in front of the display and whether the user pays attention to the display.

According to one embodiment of an adaptive display backlight control system, the system is operated in a control circuit of the display backlight module. The system includes a microcontroller unit, a human sensor and a backlight regulation module. The human sensor includes a human presence sensor that can be a proximity sensor used to sense if any person is in front of a display. The human sensor includes a human attention sensor that can use an image sensor to capture an image and determine if the person pays attention to the display by an intelligence operator.

The microcontroller unit generates a backlight-regulation instruction that is configured to be outputted to the backlight regulation module according to a signal generated by the human presence sensor relating to if the person is present in front of the display and a signal generated by the human attention sensor relating to if the person pays attention to the display. Accordingly, the backlight regulation module regulates a driving voltage being outputted to a backlight module of the display according to the backlight-regulation instruction.

In an aspect of the present disclosure, the adaptive display backlight control system further includes an ambient light sensor that can sense an ambient light around the display. Therefore, the microcontroller unit can also rely on the information of ambient light around the display, being combined with the signals generated by the human presence sensor and the human attention sensor, to regulate the driving voltage outputted to the backlight module.

In another aspect, in the process for determining whether or not a person pays attention to a display, the intelligence operator performs an eyeball-tracking process according to images captured by an image sensor in front of the display. A result of the eyeball-tracking process can be used to determine whether or not the person pays attention to the display.

In one further aspect, the intelligence operator relies on the images of pupil centers or cornea reflection images of the person in front of the display captured by the image sensor to determine whether or not the person pays attention to the display.

In another aspect, the intelligence operator defines an operating range in front of the display. Images of the head of the user can be captured within the operating range. The images captured by the image sensor within the operating range can be used by the intelligent model for determining whether or not the person pays attention to the display.

In one of the scenarios, when the microcontroller unit relies on a signal generated by the human presence sensor to determine if the person is present in front of the display, and relies on a signal generated by the human attention sensor to determine if the person pays attention to the display, the microcontroller unit accordingly generates a backlight-regulation instruction. The backlight-regulation instruction is provided to control the backlight regulation module for driving the backlight module to emit a normal backlight.

In another scenario, the microcontroller unit determines that the person is present in front of the display according to a signal relating to if the person is present in front of the display. However, the microcontroller determines that the person does not pay attention to the display according to a signal relating to if the person pays attention to the display. Accordingly, the microcontroller unit generates a backlight-regulation instruction for controlling the backlight regulation module to drive the backlight module to emit a regulated backlight.

In one further scenario, the system uses a timer to set up a non-attention time and a light-dimming time. When it is determined that the time the person does not pay attention to the display meets the non-attention time, the backlight regulation module is controlled to regulate the backlight module to emit a regulated backlight according to a ratio within the light-dimming time until the backlight is completely turned off.

The microcontroller unit generates a backlight-regulation instruction for controlling the backlight regulation module to drive the backlight module to emit a backlight under a power-saving mode or turn off the backlight if the microcontroller unit determines that the person is not present in front of the display according to a signal generated by the human presence sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

According to certain embodiments of a method for adaptively controlling a display backlight and a system of the present disclosure, the system is operated in a control circuit of a display backlight module and main circuit components of the system include a microcontroller unit for controlling operation of the system, a human sensor that is used to detect the status of a person in front of a display and a backlight regulation module that is controlled by the microcontroller unit for regulating a backlight brightness of the backlight regulation module.

One main technical concept of the method for adaptively controlling the display backlight is to incorporate a human presence sensor and a human attention sensor to a display that is capable of regulating backlight according to an ambient light. The human presence sensor allows the display to determine whether or not a person is present in front of the display and the human attention sensor allows the display to determine whether or not the person in front of the display pays attention to the display. The backlight of the display can be regulated by a control circuit according to the ambient light. The backlight of the display will be gradually dimmed until the backlight is turned off automatically if it is determined that there is not a person present in front of the display, or the person does not pay attention to the display.

Figure 1:
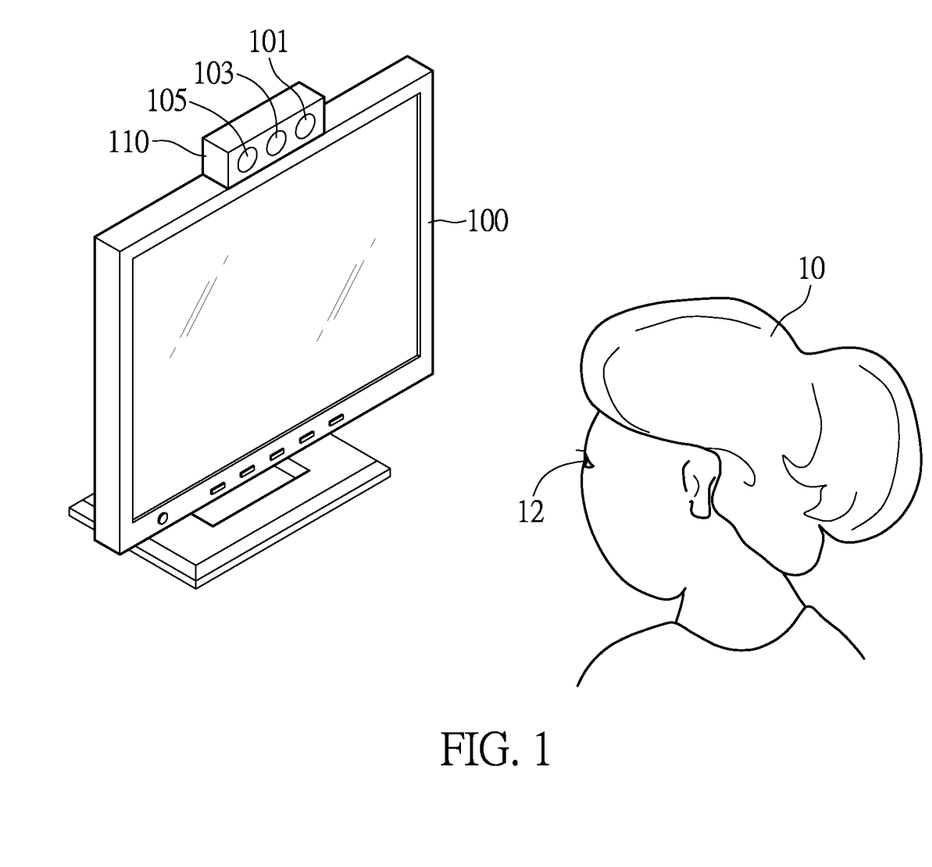
FIG. 1 is a schematic diagram illustrating a framework of an adaptive display backlight control system according to one embodiment of the present disclosure.

FIG. 1 is a schematic diagram illustrating a display that applies an adaptive display backlight control system according to one embodiment of the present disclosure. In the diagram, a person 10 sits in front of a display 100. A multifunctional sensor module 110 is disposed on a top of the display 100. The sensor module 110 includes a proximity sensor 101, an image sensor 103 and an ambient light sensor 105.

The proximity sensor 101 embodies the human presence sensor of the adaptive display backlight control system. The proximity sensor can detect image change in front of the display 100 by an image-processing technology, use an optical interruption principle with an infrared or Laser light source or detect reflective signals of an acoustic wave so as to sense if any object is in front of the display 100.

The main components of the image sensor 103 includes a photographic lens, a photosensitive component and an image signal processor that can capture continuous images of the person 10 in front of the display 100, especially to capture the images of eyes 12 of the person 10. After that, an image-processing technology or an intelligent method is used for determining an attention direction of the eyes 12, and accordingly the system can determine if the person 10 pays attention to the display 100.

Figure 6:
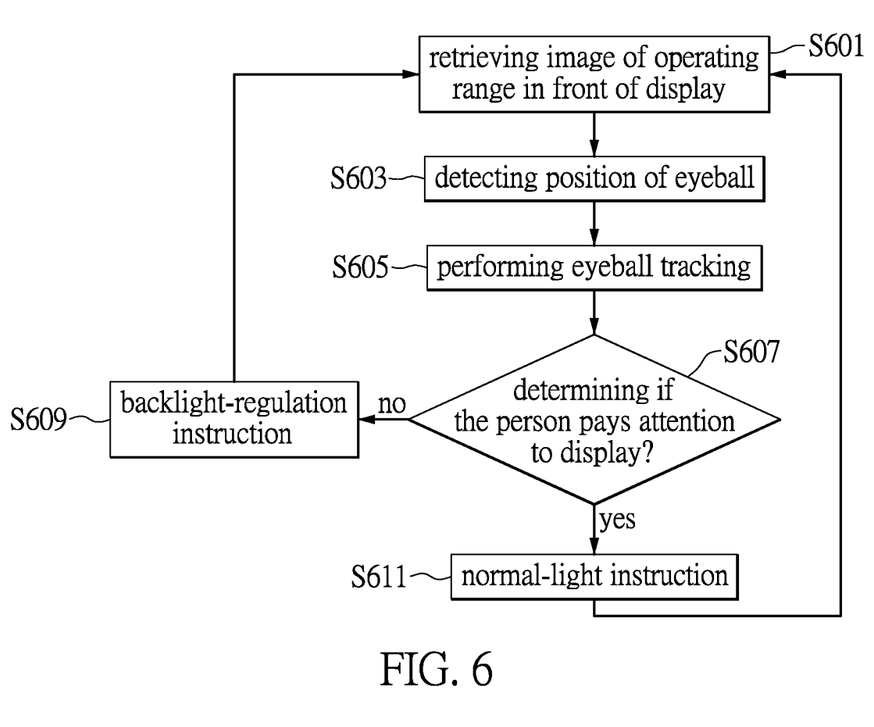
FIG. 6 is a flowchart describing a process of regulating backlight by tracking eyeballs in the method for adaptively controlling the display backlight according to one embodiment of the present disclosure.
Figure 7:
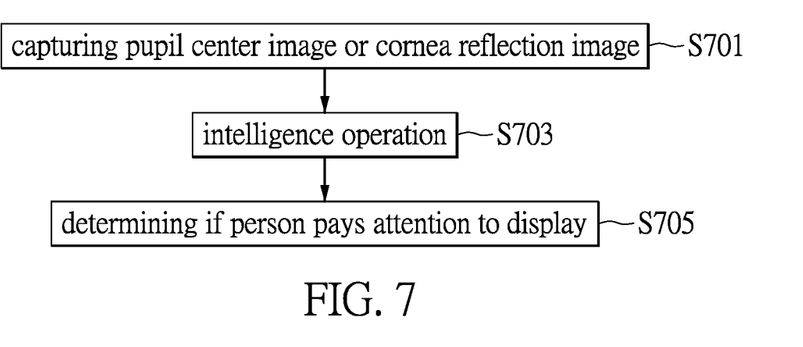
FIG. 7 is a flowchart describing a process of regulating backlight by capturing pupils or corneas in the method for adaptively controlling the display backlight according to one embodiment of the present disclosure.
Figure 8:
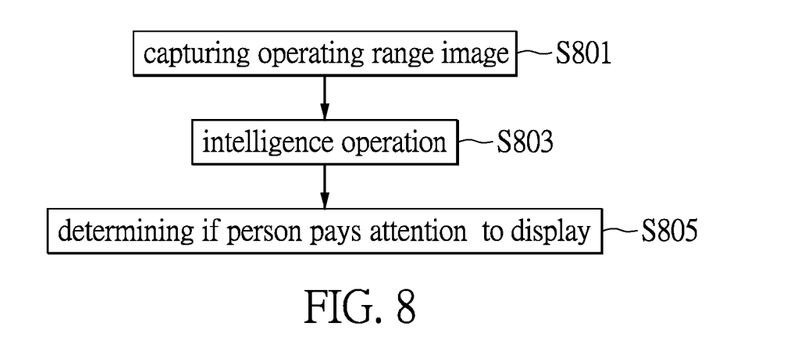
FIG. 8 is a flowchart describing a process of regulating backlight by capturing an operating range in method for adaptively controlling the display backlight according to one embodiment of the present disclosure.

The method for determining whether or not the person pays attention to the display applied to the adaptive display backlight control system can refer to a flowchart shown in FIG. 6. Reference is made to FIG. 7, which shows a flowchart describing another implementation to determine whether or not the person 10 pays attention to the display 100 can be performed by capturing images of pupil centers or cornea reflection image of the person 10. Reference is next made to FIG. 8, which is a flowchart describing a process performed in the adaptive display backlight control system for determining whether or not the person pays attention to the display by a human attention sensor that is implemented by the image sensor 103 that is used to capture images of an operating range in front of the display 100 and an image-processing technology or an intelligent model.

It should be noted that the sensor module 110 shown in the schematic diagram is used to represent one of various sensor applicable to the display 100, and the positions where the various sensors are disposed are not limited by that shown in the diagram.

Figure 2:
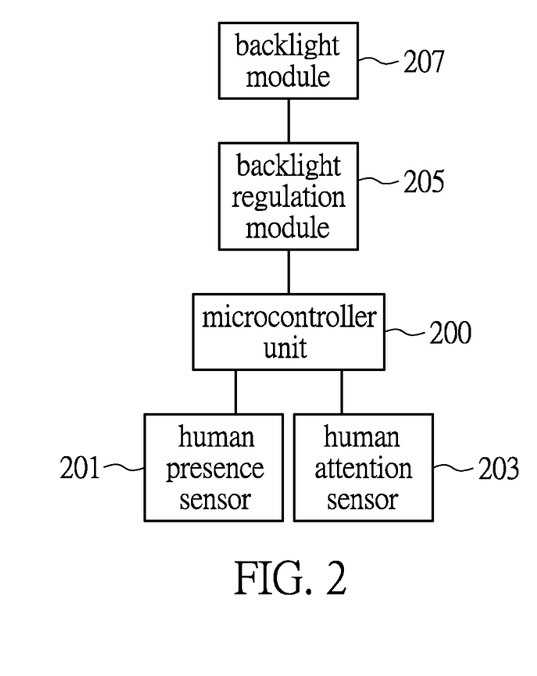
FIG. 2 is a schematic diagram illustrating main components that are used for cooperating the adaptive display backlight control system and the backlight module according to one embodiment of the present disclosure.

FIG. 2 is a schematic diagram illustrating main components of the arrangement of the adaptive display backlight control system and a backlight module according to one embodiment of the present disclosure. The system can be adaptable to the circumstance shown in FIG. 1.

The main components of the adaptive display backlight control system shown in the diagram include a microcontroller unit 200 that is used to control operations of the circuit elements of the system and transmit signals to external circuit elements, and a human presence sensor 201 and human attention sensor 203 electrically connected with the microcontroller unit 200. The human presence sensor 201 is used to sense if the person 10 is present in front of the display 100. The human attention sensor 203 is used to sense whether or not the person 10 in front of the display 100 pays attention to the display 100. The microcontroller unit 200 also electrically connects with other circuit elements such as a backlight regulation module 205 and a backlight module 207 of the display 100.

When the system is in operation, the human presence sensor 201 generates a signal relating to if the person 10 is present in front of the display 100, and the human attention sensor 203 generates a signal relating to if the person 10 pays attention to the display 100. The microcontroller unit 200 obtains the sensing signals generated by the human presence sensor 201 and the human attention sensor 203 so as to generate a backlight-regulation instruction being outputted to the backlight regulation module 205. The backlight regulation module 205 is used to regulate a driving voltage being outputted to the backlight module 207 according to the backlight-regulation instruction generated by the microcontroller unit 200.

Figure 3:
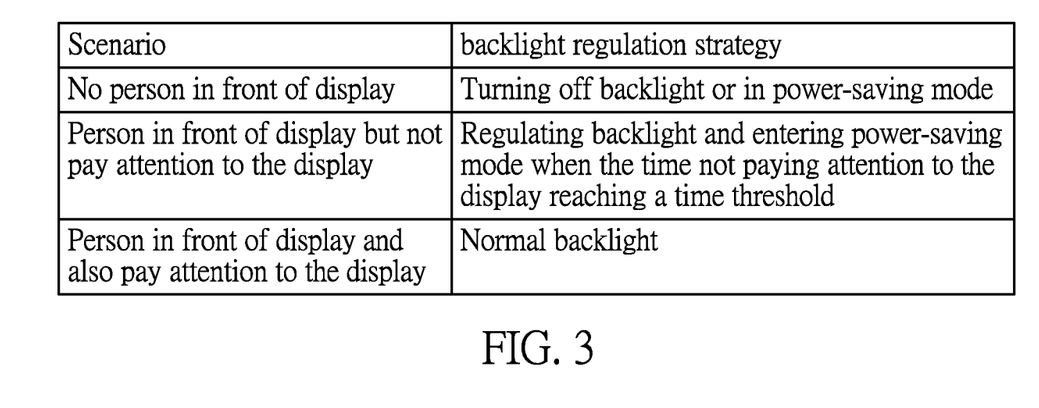
FIG. 3 shows a table illustrating backlight regulation strategy being operated in the method for adaptively controlling display backlight according to one embodiment of the present disclosure.

Under the circumstance of FIG. 1, a control strategy applied to the adaptive display backlight control system of FIG. 2 can refer to an exemplary example of a backlight regulation strategy shown in FIG. 3 that is operated in the method for adaptively controlling the display backlight.

In one of the scenarios, when the person 10 leaves the display 100, the human presence sensor 201 determines that no person is present in front of the display 100. In the meantime, the microcontroller unit 200 controls the human attention sensor 203 not to function, or the microcontroller unit 200 is configured to ignore the signals generated by the human attention sensor 203. When the microcontroller unit 200 acquires the signals indicating that the person 10 is not present in front of the display 100 generated by the human presence sensor 201. Further, it is determined that the time that the person is not present in front of the display reaches a time threshold set by the system, the microcontroller unit 200 generates a corresponding backlight-regulation instruction for the backlight regulation module 205 to regulate a driving voltage being outputted to the backlight module 207 of the display 100. Accordingly, the backlight module 207 is driven to emit a backlight under a power-saving mode or to turn the backlight off gradually.

In another scenario, the human presence sensor 201 senses that the person 10 is present in front of the display 100, but the human attention sensor 203 determines that the person 10 does not pay attention to the display 100. Similarly, if a time-counting result shows that a period of duration that the person 10 does not pay attention to the display 100 reaches another time threshold set by the system, the microcontroller unit 200 also generates a corresponding backlight-regulation instruction that drives the backlight regulation module 205 to output a driving voltage to the backlight module 207 of the display 100. The driving voltage drives the backlight module 207 to enter a power-saving mode and to emit a regulated backlight.

In third scenario, when the human presence sensor 201 senses that the person 10 is present in front of the display 100 and the human attention sensor 203 determines that the person 10 also pays attention to the display 100, the microcontroller unit 200 generates a backlight-regulation instruction to control the backlight regulation module 205 to drive the backlight module 207 to emit a normal backlight.

Figure 4:
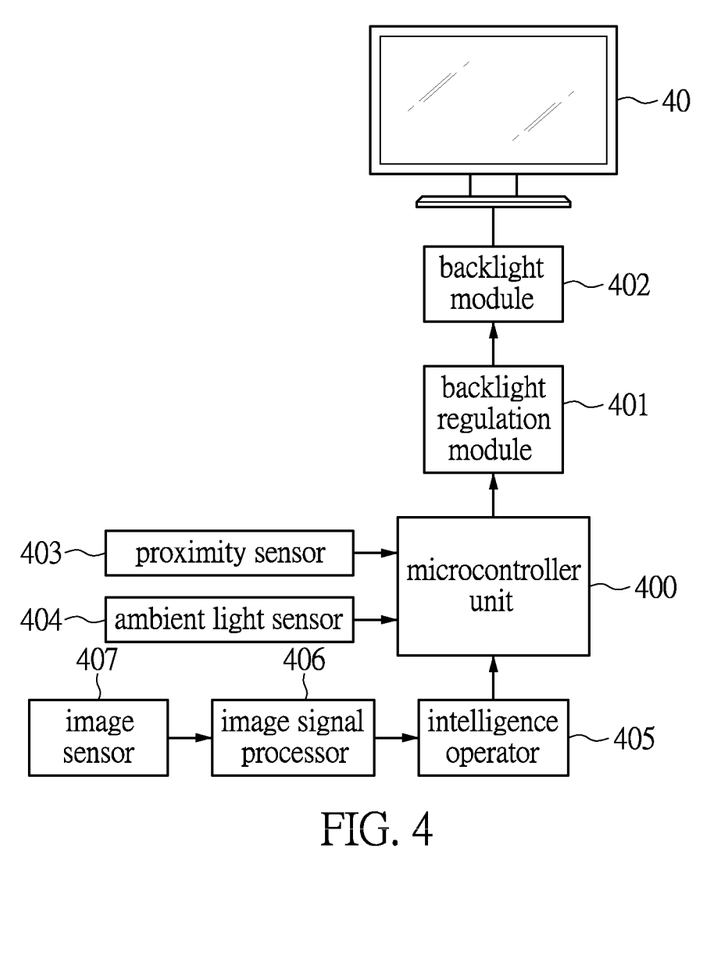
FIG. 4 is a schematic diagram illustrating a framework of the adaptive display backlight control system according to one embodiment of the present disclosure.

FIG. 4 is a schematic diagram illustrating a framework of the adaptive display backlight control system according to one embodiment of the present disclosure. A backlight regulation module 401 can adaptively regulate a backlight module 402 of a display 40 based on some conditions such as an ambient light, whether any person is present before the display 40, and whether the person pays attention to the display 40.

The circuitry shown in the diagram includes a microcontroller unit 400 and other circuit components electrically connected with the microcontroller unit 400 for operating the adaptive display backlight control system. The backlight regulation module 401 relies on a backlight-regulation instruction generated by the microcontroller unit 400 to drive the backlight module 402 to emit different levels of backlight modes such as the normal backlight, the regulated backlight, the power-saving mode backlight and turn-off backlight described in FIG. 3.

The human presence sensor can be implemented by a proximity sensor 403. The proximity sensor 403 is used to sense any object or person in front of the display 40. The microcontroller unit 400 obtains sensing signals generated by the proximity sensor 403 and generates a backlight-regulation instruction according to a predetermined backlight regulation strategy.

In an exemplary example, the human attention sensor can be implemented by an intelligence operator 405, an image signal processor 406 and an image sensor 407. In one of the embodiments of the present disclosure, the image sensor 407 disposed in front of the display 40 periodically or continuously captures images within an operating range before the display 40 and the image signal processor 406 then processes the images of the operating range so as to determine if any person is present in the operating range and also determine whether or not the person pays attention to the display 40 if the person is present before the display 40. When the system determines that any person is present in front of the display 40, the images are referred to for determining whether or not the person pays attention to the display 40. In one embodiment of the present disclosure, the intelligence operator 405 uses an intelligent model to calculate a probability that the person pays attention to the display 40 based on various image information. It is determined that the person pays attention to the display 40 if the probability meets a threshold; otherwise, it is determined that the person does not pay attention to the display 40.

The abovementioned intelligent technology adopted by the system incorporates a machine-learning algorithm to learn image features of a large number of images of human bodies and faces that pay attention to a display. The image features can be referred to for classifying and training an intelligent model that is capable of determining whether or not a person pays attention to the display. The intelligent model can operate in the intelligence operator 405. When the adaptive display backlight control system is in operation, the image sensor 407 captures images of facial features before the display 40, the image signal processor 406 processes the images and the intelligent model of the intelligence operator 405 calculates a probability that the person pays attention to the display. The microcontroller unit 400 then obtains the probability of the person paying attention to the display from the intelligence operator 405 and then determines whether or not the person pays attention to the display 40. Accordingly, the adaptive display backlight control system generates a backlight-regulation instruction according to the backlight regulation strategy.

The adaptive display backlight control system also includes an ambient light sensor 404. The ambient light sensor 404 is used to determine the information of ambient light around the display 40. The microcontroller unit 400 generates the backlight-regulation instruction for regulating the driving voltage being outputted tot eh backlight module based on the information of ambient light around the display. Further, the microcontroller unit 400 sets the backlight regulation strategy in response to the ambient light and accordingly generates the backlight-regulation instruction according to the signal generated by the ambient light sensor. The driving voltage being outputted to the backlight module is regulated according to the backlight-regulation instruction.

In summation, the signals generated by the proximity sensor 403, the ambient light sensor 404 and the intelligence operator 405 can be individually referred to for regulating the backlight of the display, in addition the microcontroller unit 400 can overall consider the various sensing signals so as to generate the backlight-regulation instruction configured to be outputted to the backlight regulation module 401 based on the backlight regulation strategy. The backlight regulation module 401 then relies on the backlight-regulation instruction to regulate the driving voltage being outputted to the backlight module 402. Therefore, the backlight of the display 40 is adaptively regulated according to the driving voltage.

Figure 5:
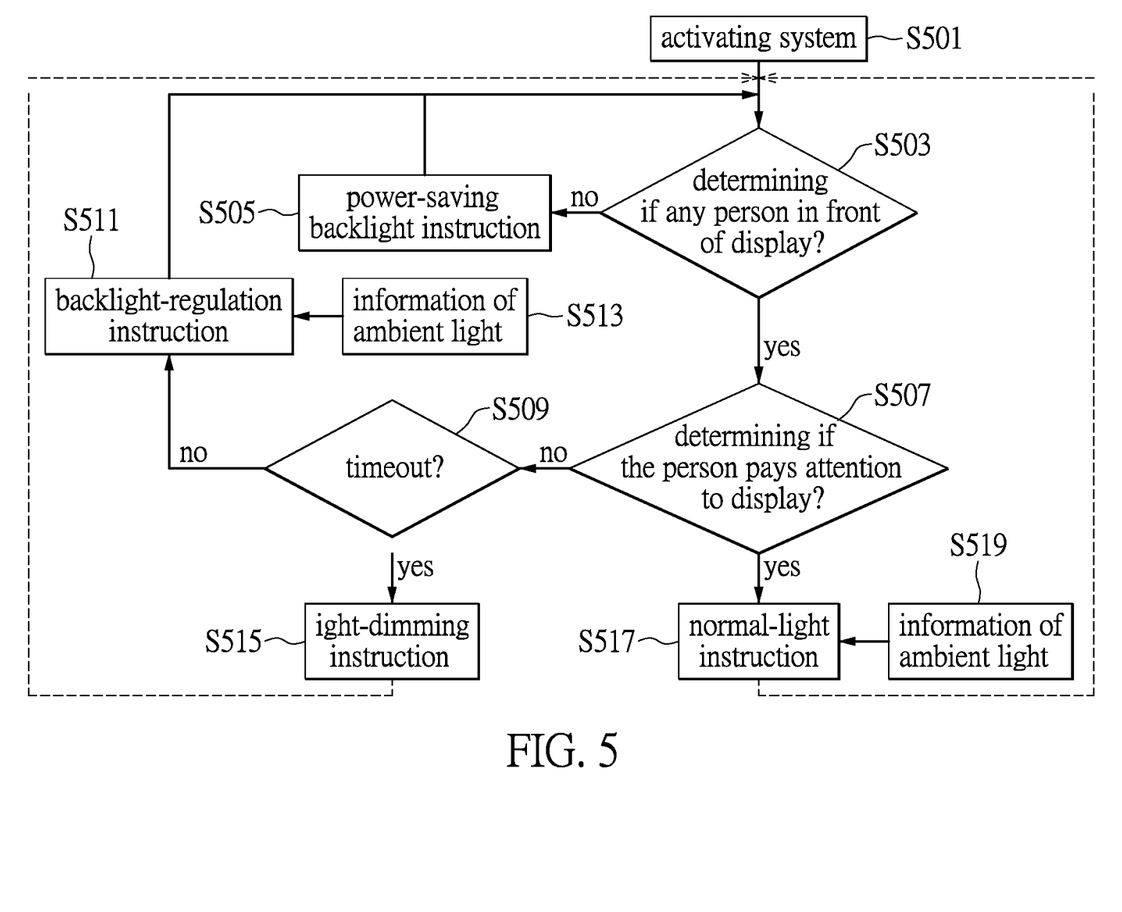
FIG. 5 is a flowchart describing the method for adaptively controlling a display backlight according to one embodiment of the present disclosure.

Reference is made to FIG. 5, which is a flowchart illustrating the method for controlling the display backlight through the adaptive display backlight control system according to one embodiment of the present disclosure. It should be noted that, when the system is in operation, the above-mentioned sensors such as the ambient light sensor, the human presence sensor and the human attention sensor can be activated when certain conditions are satisfied. Further, the human presence sensor and the human attention sensor can be full-time operated. With activation of a computer system, the microcontroller unit of the adaptive display backlight control system initializes the sensors and circuit components such as the image sensor and related circuits, the ambient light sensor, a power-management circuit, the human presence sensor, the human attention sensor and the lines connecting with the backlight regulation module.

In the beginning of the method, with the operation of the computer system, the backlight regulation module and the backlight module of the display of the adaptive display backlight control system are activated (step S501). The human presence sensor is activated to determine whether or not any person is present in front of the display (step S503). If it is determined that there is no person is in front of the display (represented as "no") the microcontroller unit generates a corresponding backlight-regulation instruction, e.g., a power-saving backlight instruction (step S505), and repeats the step S503 in order to determine whether or not any person is present in front of the display. When, in step S503, it is determined that a person is present in front of the display (represented as "yes"), the step S507 is performed.

Next, the human attention sensor is activated to determine whether or not the person pays attention to the display (step S507). If it is determined that the person pays attention to the display (represented as "yes"), the microcontroller unit acquires information of ambient light from the ambient light sensor around the display (step S519) and generates a normal-light instruction (step S517). The backlight regulation module drives the backlight module to operate according to the normal-light instruction so as to emit a normal backlight by referring to the information of ambient light. The process then goes back to step S503 for continuing to proceed the steps of detecting the presence and attention of the person.

In step S507, when it is determined that the person stays in front of the display but does not pay attention to the display (represented as "no"), the system can simultaneously start a timer for counting a period of duration of the present state and determining if the present state continues to reach a time threshold set by the system (step S509). If it is determined that a time of the person not paying attention to the display does not exceed the time threshold (i.e., not timeout), the microcontroller unit refers to the information of ambient light (step S513) so as to generate a backlight-regulation instruction (step S511) for driving the backlight module to emit a regulated backlight. Afterwards, the process goes back to step S503 for continuing to detect the states of whether or not the person is present in front of the display and pays attention to the display.

In step S509, when it is determined that a time of the person not paying attention to the display reaches a time threshold set by the system (i.e., timeout), the microcontroller unit generates a light-dimming instruction (step S515). According to one of the embodiments of the present disclosure, when the system is in operation, the microcontroller unit counts time on the status that the person is not present in front of the display and the person does not pay attention to the display. For example, the system sets up a non-attention time and a light-dimming time. When it is determined that the person does not pay attention to the display, the system acquires a period of duration from a timer. If a time that the person does not pay attention to the display reaches the non-attention time, the microcontroller unit generates a light-dimming instruction (step S515), and the backlight regulation module drives the backlight module to emit a regulated backlight according to a ratio within the light-dimming time until the backlight module is turned off.

It should be noted that the above exemplary process is not used to limit the actual operation of the adaptive display backlight control system of the disclosure. For example, even the display backlight module of the display has already operated to emit a power-saving mode backlight, the regulated backlight or in a dimming process, the backlight module can immediately be regulated to operate under a normal backlight mode once the system senses that the person is present in front of the display and also pays attention to the display. Alternatively, when it is determined that the person leaves the display and the duration also reaches another time threshold according to the timer, the microcontroller unit can control the backlight regulation module to drive the backlight module to gradually dim the backlight to turning it off even if the backlight module originally emits a normal backlight. It should be noted that the process of fading the backlight to turning it off takes about 30 seconds and the duration time can be adjusted according to an actual condition.

According to one of the embodiments of the present disclosure, the adaptive display backlight control system uses a Hysteresis timer to prevent the problem that the user is discomforted by frequently switching on and off the backlight due to overly sensitive sensor, e.g., the overly sensitive human attention sensor. For example, when the human attention sensor senses that the person changes from not paying attention to the display to paying attention to the display, the backlight regulation module of the system will immediately drive the backlight module to emit a normal backlight by referring to the information of ambient light around the display. In the meantime, the timer hysteresis timer is activated. The backlight regulation module drives the backlight module to gradually dim the backlight until turning it off once the system determines that the person does not pay attention to the display.

According to one embodiment of the adaptive display backlight control system, an intelligence operator is incorporated in the system for performing an intelligent algorithm that allows the adaptive display backlight control system to use a model trained by a machine-learning method to determine whether or not the person pays attention to the display.

According to one of the embodiments of the present disclosure, such as a flowchart shown in FIG. 6, a process of regulating the backlight by tracking eyeballs of a person is described. An operating range before the display is defined. The operating range is used to describe a range in front of the display for determining whether or not a person is present before the display. The image of the operating range relates to an image of a head of a person to be detected. The image features of the head of the person can be used to determine if the person pays attention to the display.

In FIG. 6, an image sensor is used to capture continuous images of an operating range in front of the display (step S601), and an image signal processor processes the images so as to obtain positions and images of the eyeballs through an image-processing technology. The positions and the images of the eyeballs can be obtained by an intelligent module of the system (step S603). Afterwards, a process of eye tracking can be performed on the continuous images (step S605) so as to determine whether or not the person pays attention to the display (step S607).

Next, if it is determined that the person in front of the display does not pay attention to the display according to a result of eye tracking (represented as "no") and a backlight-regulation instruction for driving the backlight module to emit a regulated backlight is generated (step S609). More specifically, the backlight regulation module controls the backlight module according to the backlight-regulation instruction. If it is determined that the person does pay attention to the display, a normal-light instruction is generated by the microcontroller unit to drive the backlight module to operate with a normal scenario (step S611).

FIG. 7 is a flowchart illustrating a process of capturing images of pupils or corneas for purpose of backlight regulation according to one embodiment of the present disclosure.

The adaptive display backlight control system captures images of pupil centers or cornea reflection images of the person by the image sensor (step S701). After that, the system can determine if the person pays attention to the display through an intelligence operation that is an intelligent model trained by learning a large number of images of the pupil centers and the cornea reflection images relating to whether or not the person pays or does not pay attention to the display (step S703). The result of calculation of the intelligent model is referred to for determining whether or not the person pays attention to the display (step S705). Thus, the system performs backlight regulation according to the determination.

FIG. 8 is a flowchart describing a process of capturing images of an operating range for purpose of backlight regulation according to one embodiment of the present disclosure.

In the method for controlling adaptive display backlight control system, the image sensor is used to capture images of the operating range in front of the display (step S801). For example, the image sensor captures the facial images of the person and the intelligence operation can calculate a probability of whether the person pays attention to the display according to the image features of the operating range (step S803). The probability allows the system to determine whether or not the person pays attention to the display (step S805).

In summation, according to the certain embodiments of the method for adaptively controlling the display backlight and the system, in addition to using sensor to determine the information of ambient light around the display and the state of whether the person is present in front of the display, an intelligence operation is especially used in the system for efficiently determining whether or not the person pays attention to the display. Any electronic device applying the system can effectively achieve power saving by regulating the backlight.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive display backlight control system, comprising:
   a microcontroller unit;
   a human presence sensor, electrically connected with the microcontroller unit, used to sense whether a person is in front of a display;
   a human attention sensor, electrically connected with the microcontroller unit, being implemented by an image sensor and an intelligence operator that defines an operating range in front of the display and determines whether the person in front of the display is paying attention to the display according to images captured by the image sensor within the operating range; and a backlight regulation module, electrically connected with the microcontroller unit, used to regulate a driving voltage of a backlight module of the display according to a backlight-regulation instruction generated by the microcontroller unit;

wherein the microcontroller unit generates the backlight-regulation instruction being outputted to the backlight regulation module according to a signal generated by the human presence sensor relating to whether the person is present in front of the display and a signal generated by the human attention sensor relating to whether the person is paying attention to the display.

2. The adaptive display backlight control system according to claim 1, further comprising an ambient light sensor, electrically connected with the microcontroller unit, used to determine information of an ambient light around the display and enable the microcontroller unit to further regulate the driving voltage being outputted to the backlight module according to signals generated by the ambient light sensor.

3. The adaptive display backlight control system according to claim 1, wherein the human presence sensor is implemented by a proximity sensor for determining whether the person is in front of the display.

4. The adaptive display backlight control system according to claim 1, wherein, when the microcontroller unit determines that the person is present in front of the display according to signals generated by the human presence sensor and determines that the person is paying attention to the display according to signals generated by the human attention sensor, the microcontroller unit generates the backlight-regulation instruction for controlling the backlight regulation module to drive the backlight module to emit a normal backlight.

5. The adaptive display backlight control system according to claim 1, wherein, when the microcontroller unit determines that the person is present in front of the display according to signals generated by the human presence sensor and determines that the person is not paying attention to the display according to signals generated by the human attention sensor, the microcontroller unit generates the backlight-regulation instruction for controlling the backlight regulation module to drive the backlight module to emit a regulated backlight.

6. The adaptive display backlight control system according to claim 5, wherein the adaptive display backlight control system uses a timer to set up a non-attention time and a light-dimming time; when it is determined that a time that the person is not paying attention to the display reaches the non-attention time, the backlight regulation module is regulated according to a ratio within the light-dimming time until the backlight module is turned off.

7. The adaptive display backlight control system according to claim 1, wherein, when the microcontroller unit determines that the person is not present in front of the display according to signals generated by the human presence sensor, the microcontroller unit generates the backlight-regulation instruction for controlling the backlight regulation module to drive the backlight module to emit a backlight under a power-saving mode or turn off the backlight of the display.

8. A method for adaptively controlling a backlight of a display, performed in a microcontroller unit, comprising:
determining whether a person is in front of the display by a human presence sensor;

determining whether the person is paying attention to the display by a human attention sensor; and generating, by the microcontroller unit, a backlight-regulation instruction being outputted to a backlight regulation module according to a signal generated by the human presence sensor relating to whether the person is present in front of the display and a signal generated by the human attention sensor relating to whether the person is paying attention to the display, so as to enable the backlight regulation module to regulate a driving voltage being outputted to a backlight module of the display according to the backlight-regulation instruction;

wherein the human attention sensor is implemented by an image sensor and an intelligence operator, and the intelligence operator defines an operating range in front of the display and determines whether the person is paying attention to the display according to images captured by the image sensor within the operating range.

9. The method according to claim 8, wherein the microcontroller unit obtains information of ambient light around the display by an ambient light sensor and enables the microcontroller unit to further regulate the driving voltage being outputted to the backlight module according to signals generated by the ambient light sensor.

10. The method according to claim 8, wherein, when the microcontroller unit determines that the person is present in front of the display according to signals generated by the human presence sensor and determines that the person is paying attention to the display according to signals generated by the human attention sensor, the microcontroller unit generates the backlight-regulation instruction for controlling the backlight regulation module to drive the backlight module to emit a normal backlight.

11. The method according to claim 8, wherein, when the microcontroller unit determines that the person is present in front of the display according to signals generated by the human presence sensor and determines that the person is not paying attention to the display according to signals generated by the human attention sensor, the microcontroller unit generates the backlight-regulation instruction for controlling the backlight regulation module to drive the backlight module to emit a regulated backlight; wherein, a timer is incorporated to set up a non-attention time and a light-dimming time, when it is determined that a time that the person is not paying attention to the display reaches the non-attention time, the backlight regulation module is regulated according to a ratio within the light-dimming time until the backlight module is turned off.

12. The method according to claim 8, wherein, when the microcontroller unit determines that the person is not present in front of the display according to signals generated by the human presence sensor, the microcontroller unit generates the backlight-regulation instruction for controlling the backlight regulation module to drive the backlight module to emit the backlight under a power-saving mode or turn off the backlight of the display.

13. A method for adaptively controlling a backlight of a display, performed in a microcontroller unit, comprising:
determining whether a person is in front of the display by a human presence sensor;

determining whether the person is paying attention to the display by a human attention sensor; and generating, by the microcontroller unit, a backlight-regulation instruction being outputted to a backlight regulation module according to a signal generated by the human presence sensor relating to whether the person is present in front of the display and a signal generated by the human attention sensor relating to whether the person is paying attention to the display, so as to enable the backlight regulation module to regulate a driving voltage being outputted to a backlight module of the display according to the backlight-regulation instruction;

wherein the human attention sensor is implemented by an image sensor and an intelligence operator, and the intelligence operator performs an eyeball-tracking process according to images before the display captured by the image sensor and determines whether the person is paying attention to the display according to a result of the eyeball-tracking process.

14. The method according to claim 13, wherein the microcontroller unit obtains information of ambient light around the display by an ambient light sensor and enables the microcontroller unit to further regulate the driving voltage being outputted to the backlight module according to signals generated by the ambient light sensor.

15. The method according to claim 13, wherein, when the microcontroller unit determines that the person is present in front of the display according to signals generated by the human presence sensor and determines that the person is paying attention to the display according to signals generated by the human attention sensor, the microcontroller unit generates the backlight-regulation instruction for controlling the backlight regulation module to drive the backlight module to emit a normal backlight.

16. The method according to claim 13, wherein, when the microcontroller unit determines that the person is present in front of the display according to signals generated by the human presence sensor and determines that the person is not paying attention to the display according to signals generated by the human attention sensor, the microcontroller unit generates the backlight-regulation instruction for controlling the backlight regulation module to drive the backlight module to emit a regulated backlight; wherein, a timer is incorporated to set up a non-attention time and a light-dimming time, when it is determined that a time that the person is not paying attention to the display reaches the non-attention time, the backlight regulation module is regulated according to a ratio within the light-dimming time until the backlight module is turned off.

17. The method according to claim 13, wherein, when the microcontroller unit determines that the person is not present in front of the display according to signals generated by the human presence sensor, the microcontroller unit generates the backlight-regulation instruction for controlling the backlight regulation module to drive the backlight module to emit the backlight under a power-saving mode or turn off the backlight of the display.

* * * * *